(12) United States Patent
Onda et al.

(10) Patent No.: US 10,693,392 B2
(45) Date of Patent: Jun. 23, 2020

(54) POWER CONVERSION DEVICE AND ELECTRIC MOTOR DRIVE DEVICE USING SAME

(71) Applicant: Mitsubishi Electric Corporation, Chiyoda-ku (JP)

(72) Inventors: Kohei Onda, Chiyoda-ku (JP); Yoshihiro Takeshima, Chiyoda-ku (JP); Tatsuya Kitamura, Chiyoda-ku (JP); Hiroyasu Iwabuki, Chiyoda-ku (JP); Hideyuki Sotome, Chiyoda-ku (JP); Takaya Muto, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/324,754

(22) PCT Filed: Nov. 21, 2016

(86) PCT No.: PCT/JP2016/084486
§ 371 (c)(1),
(2) Date: Feb. 11, 2019

(87) PCT Pub. No.: WO2018/092315
PCT Pub. Date: May 24, 2018

(65) Prior Publication Data
US 2020/0112268 A1 Apr. 9, 2020

(51) Int. Cl.
*H02M 7/5387* (2007.01)
*H02M 1/08* (2006.01)
(Continued)

(52) U.S. Cl.
CPC ....... *H02M 7/53871* (2013.01); *H02M 1/083* (2013.01); *H02P 5/74* (2013.01);
(Continued)

(58) Field of Classification Search
CPC .......... H02M 1/08; H02M 2007/4815; H02M 1/083; H02M 7/53871; H02M 7/5387; H02M 3/156; H02P 27/06; H02P 27/08
See application file for complete search history.

(56) References Cited

U.S. PATENT DOCUMENTS 4,833,584 A * 5/1989 Divan .................. H02M 7/538
363/132
6,091,615 A 7/2000 Inoshita et al.
(Continued)

FOREIGN PATENT DOCUMENTS

JP 11-220885 A 8/1999
JP 2000069758 A * 3/2000
(Continued)

OTHER PUBLICATIONS

International Search Report dated Dec. 20, 2016, in PCT/JP2016/084486 filed on Nov. 21, 2016.

*Primary Examiner* — Thai T Dinh
(74) *Attorney, Agent, or Firm* — Oblon, McClelland, Maier & Neustadt, L.L.P.

(57) ABSTRACT

A power conversion device includes a first switching unit connected between a DC power supply and an inverter circuit, a resonant circuit connected to the input of the inverter circuit and formed by connecting a capacitor, a reactor, and a second switching unit, and a control unit, wherein, during a resonant operation period in which the first switching unit is controlled to be off and the second switching unit is controlled to be on, the control unit controls the inverter circuit to shift from a mode in which current flows back through one of upper and lower arms of the inverter circuit to a mode in which current flows back through the other arm, and provides a period in which the
(Continued)

upper and lower arms for every phase of the inverter circuit are turned on simultaneously.

20 Claims, 13 Drawing Sheets

(51) Int. Cl.
*H02P 5/74* (2006.01)
*H02P 27/08* (2006.01)
*H02M 1/00* (2006.01)
*H02M 7/48* (2007.01)

(52) U.S. Cl.
CPC ... *H02P 27/085* (2013.01); *H02M 2001/0058* (2013.01); *H02M 2007/4815* (2013.01)

(56) References Cited

U.S. PATENT DOCUMENTS

| | | | | |
|---|---|---|---|---|
| 7,126,833 B2* | 10/2006 | Peng | ............... | H02M 7/4826 |
| | | | | 363/132 |
| 7,183,740 B2* | 2/2007 | Nakayama | ............ | H02P 27/08 |
| | | | | 318/798 |
| 7,847,499 B2* | 12/2010 | Nakamura | ............ | B60L 3/003 |
| | | | | 318/400.27 |
| 9,301,375 B2* | 3/2016 | Kumar | ............... | H05B 41/16 |
| 2002/0172062 A1 | 11/2002 | Furukawa et al. | | |

FOREIGN PATENT DOCUMENTS

| | | | |
|---|---|---|---|
| JP | 2000-262066 A | | 9/2000 |
| JP | 2000262066 A | * | 9/2000 |
| JP | 2003-18876 A | | 1/2003 |
| JP | 2006-352942 A | | 12/2006 |

* cited by examiner

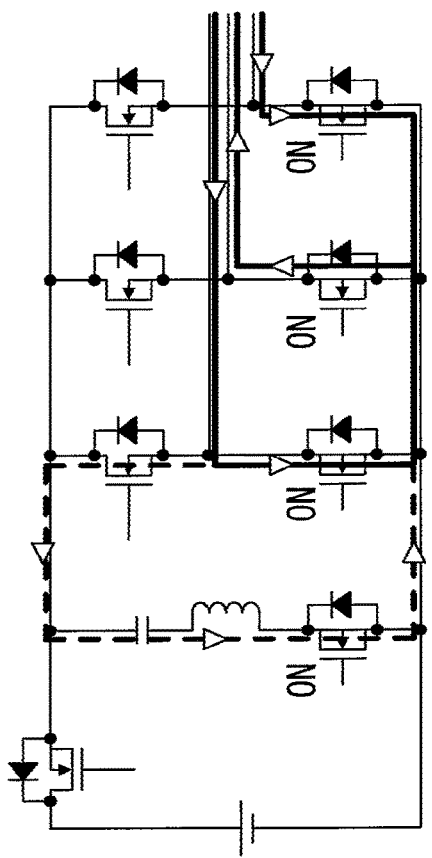
FIG. 6A
FIG. 6B
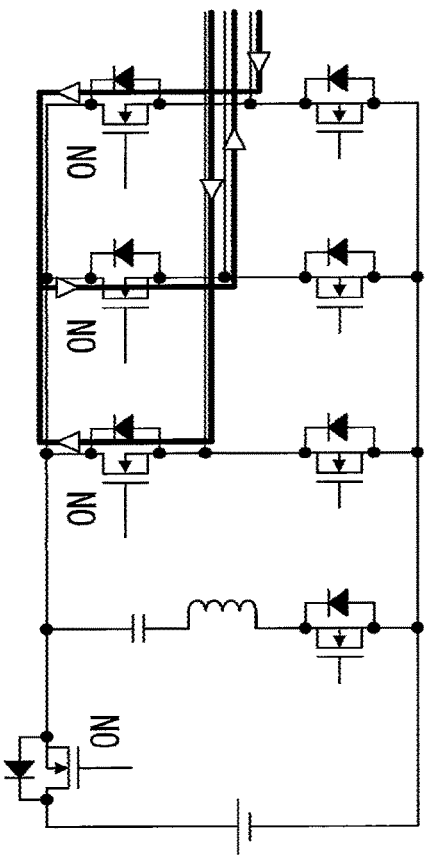
FIG. 6C
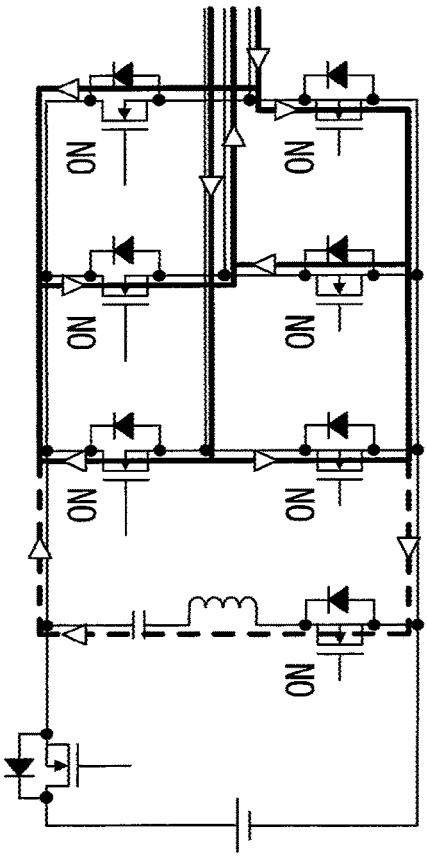
FIG. 6D

POWER CONVERSION DEVICE AND ELECTRIC MOTOR DRIVE DEVICE USING SAME

TECHNICAL FIELD

The present invention relates to a power conversion device which converts power from a DC power supply to AC power and supplies power to an electric motor such as a motor generator, and an electric motor drive device using the power conversion device.

BACKGROUND ART

An electric motor drive device for driving a motor generator used in a hybrid vehicle or the like converts power from a DC power supply to AC power and supplies power to the electric motor. In this power conversion device, semiconductor switching elements such as MOSFET (metal oxide silicon field effect transistor) are used, whereby high-speed application is achieved. For using semiconductor switching elements, switching loss increases with increase in the switching frequency due to the high-speed application, resulting in reduction in efficiency of the power conversion device.

To solve the above problem, an electric motor drive device is proposed in which an additional circuit is provided between a DC power supply and an inverter circuit so as to have a soft-switching function of suppressing switching loss when an inverter main circuit element is turned on (for example, Patent Document 1).

CITATION LIST

Patent Document

Patent Document 1: Japanese Laid-Open Patent Publication No. 2000-262066 (paragraphs [0007], [0008], and [0014], and FIG. 7)

SUMMARY OF THE INVENTION

Problems to be Solved by the Invention

However, in the invention disclosed in Patent Document 1, during a soft-switching operation period, the inverter circuit is disconnected from the DC power supply and therefore large current corresponding to motor current needs to be supplied to an LC resonant circuit, thus causing a problem of size increase of the added LC resonant circuit and a problem of reduction in efficiency of the power conversion device due to loss increase of the added LC resonant circuit.

The present invention has been made to solve the above problem, and an object of the present invention is to provide a power conversion device in which size reduction and loss reduction of the added LC resonant circuit are achieved, and an electric motor drive device using the power conversion device.

Solution to the Problems

A power conversion device according to the present invention includes: an inverter circuit which converts power from a DC power supply to single-phase or multi-phase AC power; a first switching unit connected between the DC power supply and the inverter circuit; a resonant circuit connected between input terminals of the inverter circuit and formed by connecting a capacitor, a reactor, and a second switching unit; and a control unit which controls the inverter circuit, the first switching unit, and the second switching unit, wherein, during a resonant operation period in which the first switching unit is controlled to be off and the second switching unit is controlled to be on, the control unit controls the inverter circuit so as to shift from a mode in which current flows back through one of an upper arm and a lower arm of the inverter circuit to a mode in which current flows back through the other arm, and provides a period in which the upper arm and the lower arm for every phase of the inverter circuit are turned on at the same time.

An electric motor drive device according to the present invention includes: a DC power supply; and a power conversion device including an inverter circuit which converts power from the DC power supply to single-phase or multi-phase AC power, a first switching unit connected between the DC power supply and the inverter circuit, a resonant circuit connected between input terminals of the inverter circuit and formed by connecting a capacitor, a reactor, and a second switching unit, and a control unit which controls the inverter circuit, the first switching unit, and the second switching unit, wherein the inverter circuit is connected to an electric motor, and during a resonant operation period in which the first switching unit is controlled to be off and the second switching unit is controlled to be on, the control unit of the power conversion device controls the inverter circuit so as to shift from a mode in which current flows back through one of an upper arm and a lower arm of the inverter circuit to a mode in which current flows back through the other arm, and provides a period in which the upper arm and the lower arm for every phase of the inverter circuit are turned on at the same time.

Effect of the Invention

In the power conversion device according to the present invention, during the resonant operation period in which the first switching unit is controlled to be off and the second switching unit is controlled to be on, the control unit controls the inverter circuit so as to shift from the mode in which current flows back through one of the upper arm and the lower arm of the inverter circuit to the mode in which current flows back through the other arm, and provides the period in which the upper arm and the lower arm for every phase of the inverter circuit are turned on at the same time. Therefore, size reduction and loss reduction of the added LC resonant circuit can be achieved.

In the electric motor drive device according to the present invention, during the resonant operation period in which the first switching unit is controlled to be off and the second switching unit is controlled to be on, the control unit controls the inverter circuit so as to shift from the mode in which current flows back through one of the upper arm and the lower arm of the inverter circuit to the mode in which current flows back through the other arm, and provides the period in which the upper arm and the lower arm for every phase of the inverter circuit are turned on at the same time. Therefore, size reduction and loss reduction of the added LC resonant circuit can be achieved.

BRIEF DESCRIPTION OF THE DRAWINGS

FIG. 6A is a schematic diagram for illustrating soft-switching operation of the power conversion device according to embodiment 1 of the present invention.

FIG. 6B is a schematic diagram for illustrating soft-switching operation of the power conversion device according to embodiment 1 of the present invention.

FIG. 6C is a schematic diagram for illustrating soft-switching operation of the power conversion device according to embodiment 1 of the present invention.

FIG. 6D is a schematic diagram for illustrating soft-switching operation of the power conversion device according to embodiment 1 of the present invention.

DESCRIPTION OF EMBODIMENTS

Embodiment 1

Figure 1:
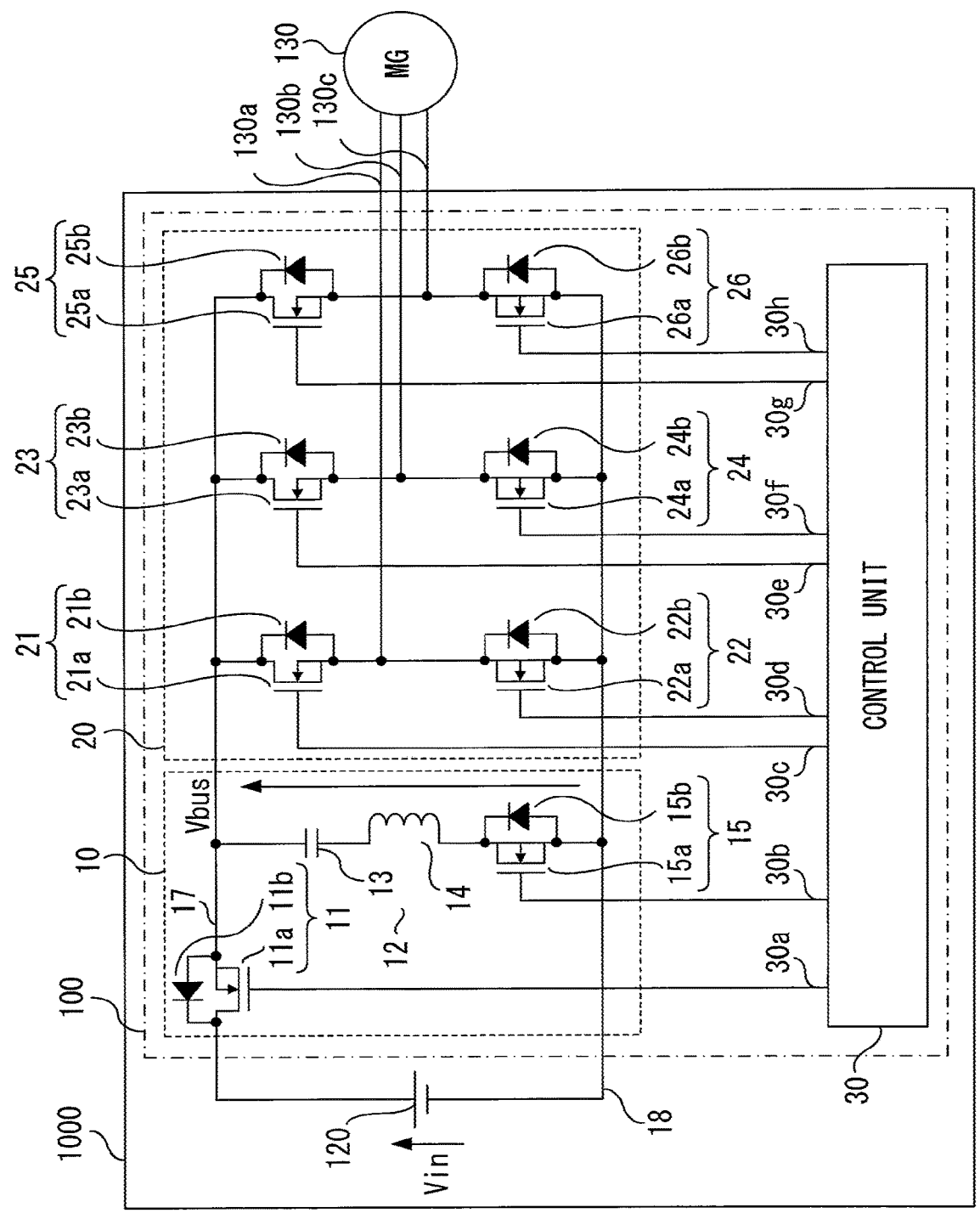
FIG. 1 is a configuration diagram of a power conversion device and an electric motor drive device according to embodiment 1 of the present invention.

Embodiment 1 relates to a power conversion device and an electric motor drive device using the power conversion device. The power conversion device includes a first switching unit connected between a DC power supply and an inverter circuit; a resonant circuit connected between input terminals of the inverter circuit and formed by connecting a capacitor, a reactor, and a second switching unit in series; and a control unit which controls the inverter circuit, the first switching unit, and the second switching unit, wherein, during a resonant operation period in which the first switching unit is controlled to be off and the second switching unit is controlled to be on, the control unit controls the inverter circuit so as to shift from a mode in which current flows back through one of an upper arm and a lower arm of the inverter circuit to a mode in which current flows back through the other arm, and provides a period in which the upper arm and the lower arm for every phase of the inverter circuit are turned on at the same time.

Hereinafter, the configuration and operation of a power conversion device and an electric motor drive device according to embodiment 1 of the invention of the present disclosure will be described with reference to FIG. 1 which is a configuration diagram of the power conversion device and the electric motor drive device, FIG. 2 which is an internal block diagram of a control unit in the power conversion device, FIG. 3 which is a time chart for illustrating operation, FIG. 4 which is an enlarged view of a part of the time chart for illustrating operation, FIGS. 5A and 5B which illustrate soft-switching operation, FIGS. 6A, 6B, 6C, AND 6C which are schematic diagrams for illustrating soft-switching operation, FIG. 7 which illustrates operation in a comparative example, and FIG. 8 which is a time chart for illustrating soft-switching operation for one phase of the inverter.

First, the entire configuration of the power conversion device and the electric motor drive device according to embodiment 1 will be described with reference to FIG. 1.

An electric motor drive device system is composed of an electric motor drive device 1000 and an electric motor 130. The electric motor drive device 1000 is composed of a power conversion device 100 and a power storage device 120 which is a DC power supply. The power conversion device 100 includes a soft-switching circuit 10, an inverter circuit 20, and a control unit 30.

In FIG. 1, the electric motor 130 is not a part of the electric motor drive device 1000, but closely relates to the electric motor drive device in operation. Therefore, in the following description, the electric motor 130 is treated as a part of the electric motor drive device without being specifically discriminated.

Next, the entire function of the electric motor drive device 1000 and the power conversion device 100 will be described with reference to FIG. 1.

The electric motor drive device 1000 according to the present embodiment controls the electric motor 130. In the case where the electric motor 130 operates as a motor for driving a load, the electric motor drive device 1000 converts power supplied from the power storage device 120 such as a capacitor, or a lithium ion battery or a nickel metal hydride battery which is a DC power supply to AC power by the power conversion device 100, and drives the electric motor 130 which is a motor, by the converted power.

The power conversion device 100 includes the inverter circuit 20 which supplies power to the electric motor 130 which is a motor as a load; the soft-switching circuit 10 connected between the inverter circuit 20 and the power storage device 120; and the control unit 30 which controls the soft-switching circuit 10 and the inverter circuit 20. A main circuit positive potential portion 17 of the inverter circuit 20 is connected to a plus terminal of the power storage device 120 via the soft-switching circuit 10, and a main circuit reference potential portion 18 is connected to a minus terminal of the power storage device 120 via the soft-switching circuit 10.

In contrast, the electric motor drive device 1000 according to embodiment 1 is also applicable to the case where the electric motor 130 operates as an electric generator. In this case, the electric motor 130 operating as an electric generator converts motive power to AC power, and the power conversion device 100 converts the AC power to DC power and supplies the power to the power storage device 120.

That is, the electric motor drive device 1000 according to embodiment 1 can achieve an electric motor drive device with a small size and small loss regardless of the direction of power transmitted by the power conversion device 100.

Next, the circuit configuration of each part of the power conversion device 100 will be described with reference to FIG. 1 and FIG. 2. First, the soft-switching circuit 10 will be described.

The soft-switching circuit 10 is composed of a first switching unit 11 and a resonant circuit 12. The resonant circuit 12 is a series circuit formed from a capacitor 13, a reactor 14, and a second switching unit 15.

In the soft-switching circuit 10, the first switching unit 11 is connected to the positive terminal of the power storage device 120. In the present embodiment 1, an example in which the drain terminal of a switching element 11*a* and the cathode terminal of an antiparallel diode 11*b* are connected thereto, is shown.

The other end (the source terminal of the switching element 11*a* and the anode terminal of the antiparallel diode 11*b*) of the first switching unit 11 is connected to the main circuit positive potential portion 17. The main circuit positive potential portion 17 and one end of the capacitor 13 are connected to each other. The other end of the capacitor 13 is connected to one end of the reactor 14. The drain terminal of a switching element 15*a* and the cathode terminal of an antiparallel diode 15*b*, which compose the second switching unit 15, are connected to the other end of the reactor 14.

In contrast, the source terminal of the switching element 15*a* and the anode terminal of the antiparallel diode 15*b* are connected to the main circuit reference potential portion 18.

That is, the resonant circuit 12 which is a series circuit of the capacitor 13, the reactor 14, and the second switching unit 15 is connected between the input terminals of the inverter circuit 10, i.e., between the main circuit positive potential portion 17 and the main circuit reference potential portion 18.

In the present embodiment 1, it is assumed that MOSFETs are used as the switching elements. In the present embodiment 1, an example in which the first switching unit and the second switching unit are each composed of a switching element and an antiparallel diode, is shown. However, a parasitic diode of a switching element may be substituted for the antiparallel diode.

Instead of the MOSFET, an IGBT (insulated gate bipolar transistor) or another switching element may be used. The switching element is not limited to a silicon single element semiconductor, but may be a compound semiconductor using silicon carbide, gallium nitride, or the like.

Next, the inverter circuit 20 will be described.

The inverter circuit 20 is a three-phase inverter to which pulse width modulation (PWM) control is applied, and three arms each formed by connecting two switching elements in series are connected in parallel.

In FIG. 1, inverter switching units 21, 22, 23, 24, 25, 26 form the respective arms, and each inverter switching unit is composed of a switching element and an antiparallel diode. For example, the inverter switching unit 21 is composed of a switching element 21*a* and an antiparallel diode 21*b*.

The drain terminal of the switching element 21*a* is connected to the main circuit positive potential portion 17, and the source terminal of the switching element 21*a* is connected in series to the drain terminal of the switching element 22*a*. The source terminal of the switching element 22*a* is connected to the main circuit reference potential portion 18. Similarly, the drain terminals of the switching element 23*a* and the switching element 25*a* are connected to the main circuit positive potential portion 17, and the source terminals thereof are respectively connected in series to the drain terminals of the switching element 24*a* and the switching element 26*a*. The source terminals of the switching element 24*a* and the switching element 26*a* are connected to the main circuit reference potential portion 18.

In the present embodiment 1, the arm formed by the switching element 21*a* and the switching element 22*a* is referred to as U phase, the arm formed by the switching element 23*a* and the switching element 24*a* is referred to as V phase, and the arm formed by the switching element 25*a* and the switching element 26*a* is referred to as W phase.

The connection point between the switching element 21*a* and the switching element 22*a* is connected to a U-phase terminal 130*a* of the electric motor 130. The connection point between the switching element 23*a* and the switching element 24*a* is connected to a V-phase terminal 130*b* of the electric motor 130. The connection point between the switching element 25*a* and the switching element 26*a* is connected to a W-phase terminal 130*c* of the electric motor 130.

Next, the control unit 30 will be described.

The control unit 30 includes a reference signal generation circuit 40, a saw-tooth-wave carrier generation circuit 50, a control signal generation circuit 60, and a gate drive circuit unit 70.

The reference signal generation circuit 40 includes a sinewave signal generation source 41 and phase shifters 42*a*, 42*b*. The control signal generation circuit 60 includes comparators 61*a* to 61*e*, inversion circuits 62*a* to 62*d*, fixed delay circuits 63*a* to 63*c*, an addition circuit 64, and a dead time generation circuit 65. The gate drive circuit unit 70 includes gate drive circuits 70*a* to 70*h*.

Here, signal interfaces among the control unit 30, the soft-switching circuit 10, the inverter circuit 20, and the electric motor 130 will be described.

A gate control signal 30*a* from the control unit 30 is connected to the gate terminal of the switching element 11*a*. A gate control signal 30*b* is connected to the gate terminal of the switching element 15*a*. Gate control signals 30*c* to 30*h* are respectively connected to the gate terminals of the switching elements 21*a* to 26*a*.

Here, the control signals to be given for the gate terminals of the switching elements are given using the respective source terminals as a reference, and actually, there are connection wires with the respective source terminals, but they are not shown in FIG. 1 for the purpose of simplification.

As the electric motor 130, overall AC electric motors such as a motor generator are applicable. The inverter circuit 20 is not limited to the three-phase inverter, but may be a single-phase inverter, a two-phase inverter, or a multi-phase inverter for four or more phases.

Next, control and circuit operation of the control unit 30 will be described. FIG. 2 is an internal block diagram of the control unit 30, and illustrates a method for generating the gate control signals 30*c* to 30*h* for the switching elements 21*a* to 26*a*.

In general, it is known that PWM control of an inverter is performed using a carrier signal and a reference signal. As the carrier signal in the present embodiment 1, an example in which a saw-tooth-wave carrier signal 50*a* is generated by the saw-tooth-wave carrier generation circuit 50 is shown.

In contrast, as the reference signal, a sinewave is generated by the sinewave signal generation source 41 in the reference signal generation circuit 40. On the basis of this reference signal, the phase shifters 42*a*, 42*b* generate signals shifted by phases of +2/3π and +4/3π. In the present embodiment 1, sinewave reference signals 40a, 40b, 40c respectively correspond to U phase, V phase, W phase.

The saw-tooth-wave carrier signal 50a and the sinewave reference signals 40a to 40c are compared and determined by the comparators 61a to 61c, respectively, whereby control signals for the upper and lower arms for each phase are generated. For example, the gate control signal 30c for the upper arm switching element 21a for U phase is generated by amplifying the output of the comparator 61a by the gate drive circuit 70c.

In contrast, the gate control signal 30d for the lower arm switching element 22a for U phase is generated by logically inverting the output of the comparator 61a by the inversion circuit 62a, adding a predetermined time delay to the resultant signal by the fixed delay circuit 63a, and then amplifying the resultant signal by the gate drive circuit 70d.

As a result, the gate control signals 30c to 30h shown in FIG. 3 described later are generated.

It is noted that the predetermined time for delaying the fixed delay circuits 63a to 63c is determined from a time constant of the capacitor 13 and the reactor 14.

In contrast, the gate control signals 30a and 30b for the switching elements 11a and 15a of the soft-switching circuit 10 are generated on the basis of a result of comparison and determination between reference signals Vref1, Vref2 and the saw-tooth-wave carrier signal 50a by the comparators 61d and 61e, respectively.

Specifically, the comparator 61d determines a state in which the saw-tooth-wave carrier signal 50a is greater than the positive reference signal Vref1. In contrast, the comparator 61e determines a state in which the saw-tooth-wave carrier signal 50a is smaller than the negative reference signal Vref2. The outputs of the comparator 61d and the comparator 61e are added by the addition circuit 64. As a result, the output of the addition circuit 64 becomes H state in a period before and after a point at which the value of the saw-tooth-wave carrier signal 50a is reset (a point at which the differential value is discontinuous). The output of the addition circuit 64 is amplified by the gate drive circuit 70a, whereby the gate control signal 30a is generated.

Meanwhile, the output of the addition circuit 64 is logically inverted by the inversion circuit 62d, and then the dead time generation circuit 65 adds a dead time thereto so that the switching elements 11a and 15a are not turned on at the same time. The output signal from the dead time generation circuit 65 is amplified by the gate drive circuit 70b, whereby the gate control signal 30b is generated.

In the present embodiment 1, the dead time generation circuit 65 is provided for minimizing current that flows through the reactor 14 of the soft-switching circuit 10 and thus suppressing extra loss. However, because the reactor 14 present between the switching elements 11a and 15a suppresses sharp increase in the current, a configuration not having the dead time generation circuit 65 is also possible.

It is noted that, as for the gate drive circuits 70a to 70h of the gate drive circuit unit 70, the source potentials of the switching elements driven by the respective gate drive circuits are different from each other, and therefore the gate drive circuits are provided with insulation interfaces and insulation power supplies.

Next, operation of the soft-switching circuit which is a feature of the power conversion device 100 according to the present embodiment 1 will be described with reference to FIG. 3.

Figure 3:
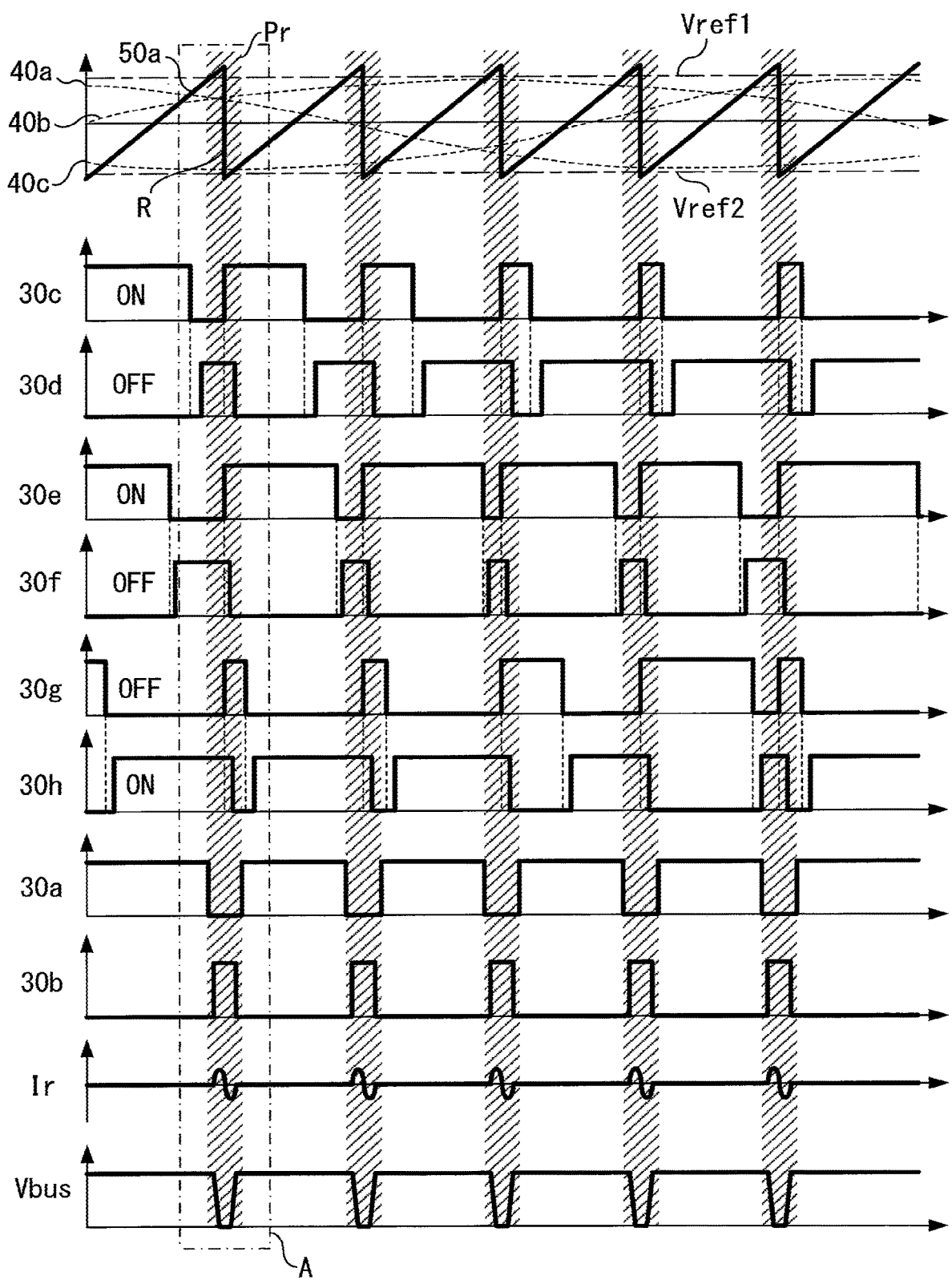
FIG. 3 is a time chart for illustrating operation of the power conversion device according to embodiment 1 of the present invention.

FIG. 3 is a time chart for illustrating operation of the soft-switching circuit according to the present embodiment 1, and schematically shows signal waveforms.

In FIGS. 3, 40a to 40b indicate sinewave reference signals for U phase, V phase, W phase. 30a and 30b indicate gate control signals for the switching elements 11a and 15a. 30c to 30h indicate gate control signals for the switching elements 21a to 26a of the upper and lower arms. Ir indicates current flowing through the reactor 14, and Vbus indicates voltage of the main circuit positive potential portion 17. R indicates reset.

As shown in FIG. 3, with respect to switching of the switching elements 21a to 26a during a rising period of the saw-tooth-wave carrier signal 50a, the switching element 11a of the soft-switching circuit is kept in an ON state and the switching element 15a is kept in an OFF state. Therefore, at this time, soft-switching operation is not performed.

In addition, to prevent short-circuit of the upper and lower arm switching elements (for example, 21a and 22a), a dead time (hereinafter, positive dead time) having a predetermined period is provided by the fixed delay circuits 63a to 63c. The circuit operation during the rising period of the saw-tooth-wave carrier signal 50a is the same as in conventional general three-phase inverter control.

In contrast, because the saw-tooth-wave carrier signal 50a is adopted, all the switching elements 21a to 26a perform switching operation at the time of reset of the saw-tooth wave, and during a period (resonant circuit operation period Pr in FIG. 3) before and after this time, the switching element 11a of the soft-switching circuit 10 is turned off and the switching element 15a is turned on.

As described above, the resonant circuit operation period Pr is generated by the addition circuit 64 adding a period in which the saw-tooth-wave carrier signal 50a is greater than the positive reference signal Vref1 and a period in which the saw-tooth-wave carrier signal 50a is smaller than the negative reference signal Vref2.

During the resonant circuit operation period Pr, resonant current Ir flows through the reactor 14, and the capacitor 13 and the reactor 14 perform resonant operation, whereby a period appears in which voltage Vbus of the main circuit positive potential portion 17 drops to zero voltage. By performing switching of the switching elements 21a to 26a in the inverter circuit 10 during this period, zero voltage switching is achieved for three phases collectively.

Next, the feature and the effect of the soft-switching circuit 10 according to the present embodiment 1 will be described with reference to FIG. 4 to FIG. 8.

Figure 4:
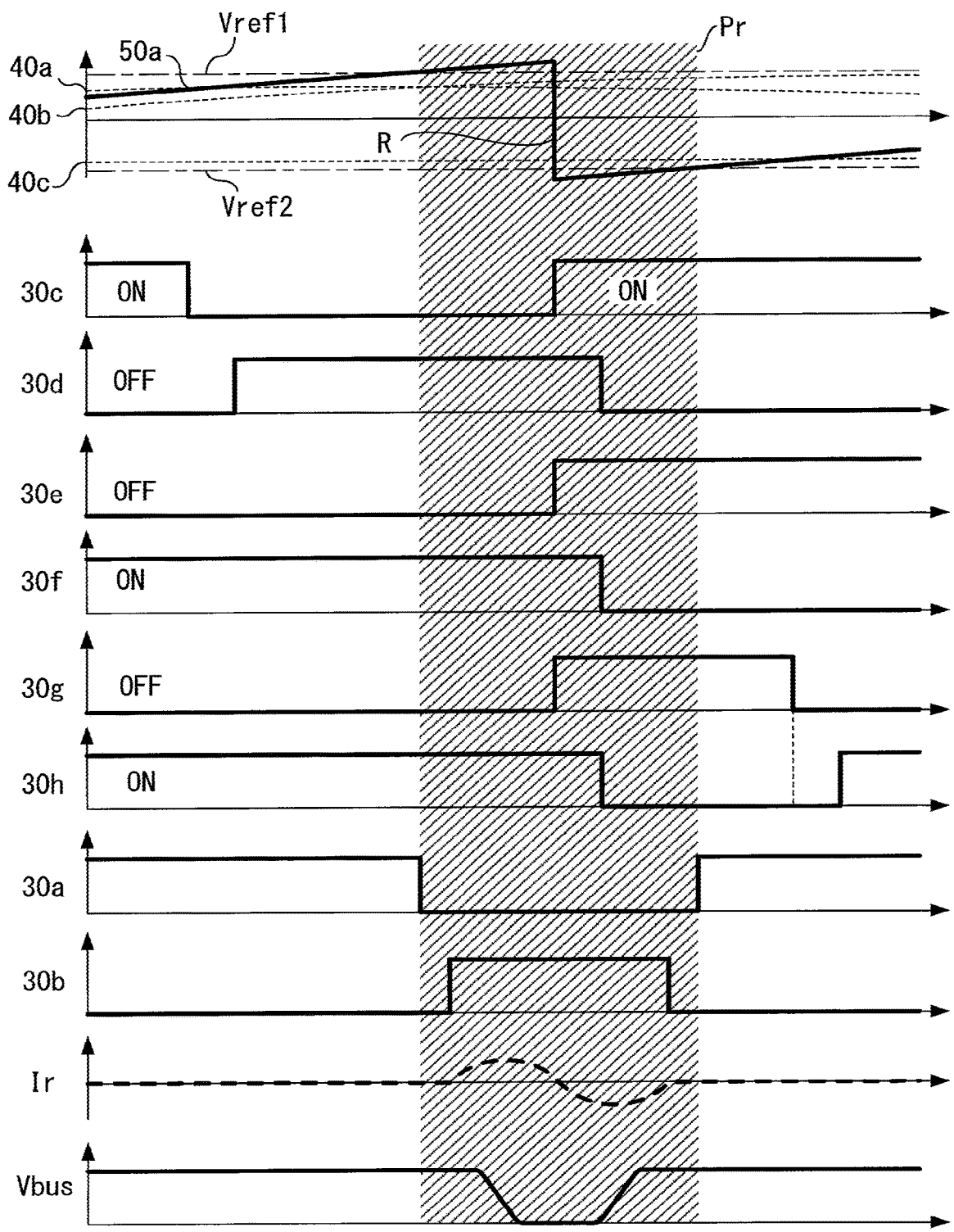
FIG. 4 is an enlarged view of a part of the time chart for illustrating operation of the power conversion device according to embodiment 1 of the present invention.

FIG. 4 shows a range A indicated by a dot-dash line around the resonant circuit operation period Pr shown in FIG. 3, in an enlarged manner so as to be understood easily. FIG. 5A and FIG. 5B show current routes in the inverter circuit 20 during periods before and after the resonant circuit operation period Pr shown in FIG. 4.

By adopting the carrier signal having a reset shape (such a shape that the sign of the signal is immediately inverted) such as a saw-tooth wave in the present embodiment 1, it is possible to perform control so as to shift from a lower arm flow-back mode (FIG. 5A) to an upper arm flow-back mode (FIG. 5B) when the carrier signal is reset.

Further, in the resonant circuit operation period Pr, the fixed delay circuits 63a to 63c provide a period (hereinafter, negative dead time) in which the upper-arm and lower-arm switching elements (for example, 21a and 22a) of the inverter circuit 10 are turned on at the same time. By providing the negative dead time, it is possible to greatly reduce current flowing through the reactor 14 for resonance, when soft-switching operation is performed.

Shifting of flow-back current from FIG. 5A to FIG. 5B will be described with reference to FIGS. 6A, 6B, 6C, and 6D which are schematic diagrams for illustrating soft-switching operation. FIG. 6 is a schematic diagram illustrating soft-switching operation in an easily understandable manner, and the reference characters are not shown.

Figure 5A:
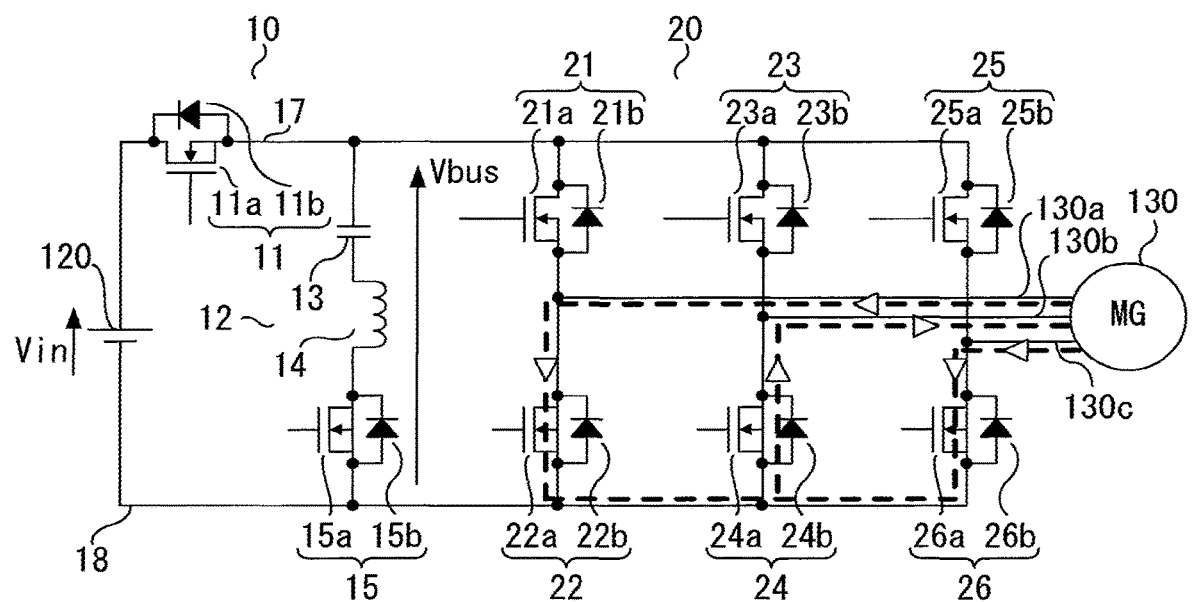
FIG. 5A illustrates soft-switching operation of the power conversion device according to embodiment 1 of the present invention.
Figure 5B:
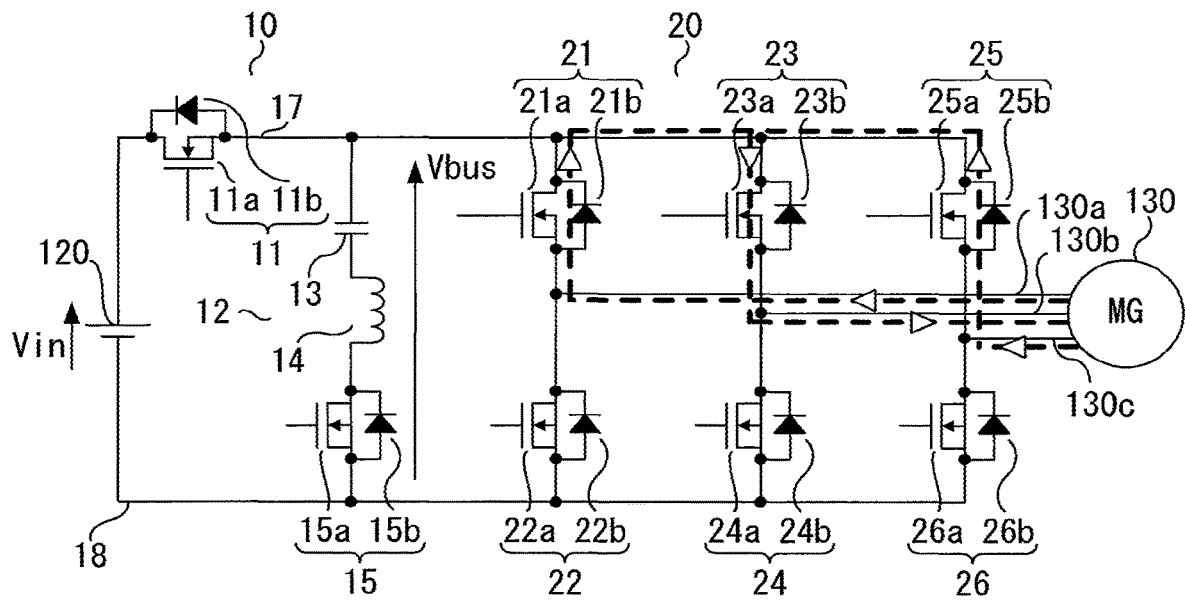
FIG. 5B illustrates soft-switching operation of the power conversion device according to embodiment 1 of the present invention.

FIG. 6A corresponds to FIG. 5A, and FIG. 6D corresponds to FIG. 5B.

FIG. 6A shows a state before the collective switching, i.e., a state in the lower arm flow-back mode, where the lower arm switching elements 22a, 24a, 26a are ON (the upper arm switching elements 21a, 23a, 25a are OFF). Further, the switching element 11a of the first switching unit 11 is ON. The flow of lower arm flow-back current is indicated by a solid line.

FIG. 6B shows a state when resonant operation starts. The lower arm switching elements 22a, 24a, 26a are ON. The switching element 11a of the first switching unit 11 is turned off and the switching element 15a of the second switching unit 15 is turned on. At this time, current flowing through the resonant circuit 12 flows counterclockwise. The flow of counterclockwise current flowing through the resonant circuit 12 is indicated by a dotted line.

Next, 6C shows a state during the resonant operation (negative dead time) period. The upper arm switching elements 21a, 23a, 25a are turned on and thus all the switching elements in the upper and lower arms are ON. The switching element 15a of the second switching unit 15 is ON. At this time, current flowing through the resonant circuit 12 flows clockwise. The flow of clockwise current flowing through the resonant circuit 12 is indicated by a dotted line.

Next, FIG. 6D shows a state after the collective switching, i.e., a state in the upper arm flow-back mode, where the upper arm switching elements 21a, 23a, 25a are ON (the lower arm switching elements 22a, 24a, 26a are OFF). Further, the switching element 11a of the first switching unit 11 is ON. The flow of upper arm flow-back current is indicated by a solid line.

Here, the reason why current flowing through the reactor 14 for resonance can be greatly reduced by providing a negative dead time when soft-switching operation is performed, will be described with reference to FIG. 7 which shows a comparative example.

Figure 7:
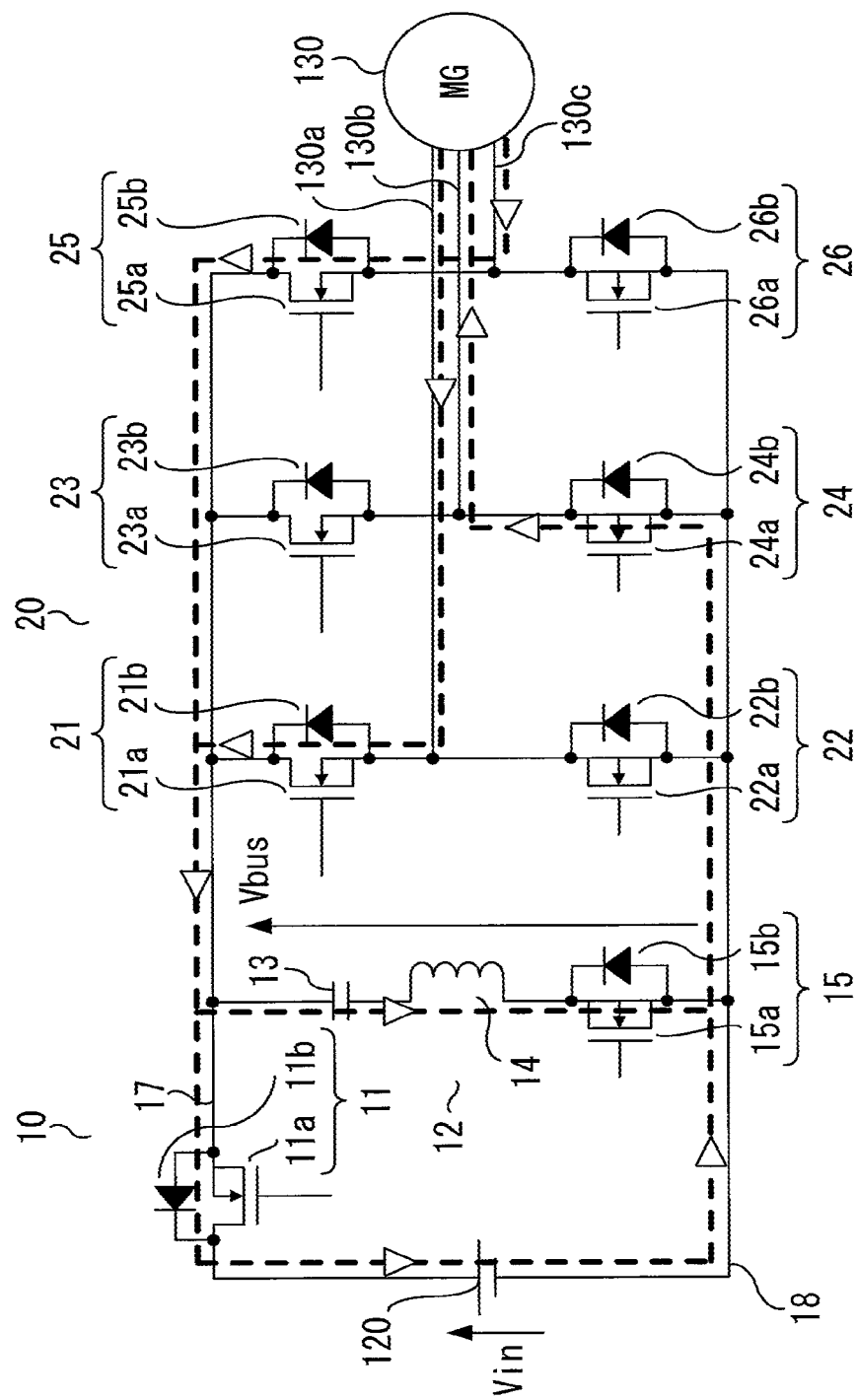
FIG. 7 illustrates operation in a comparative example of the power conversion device according to embodiment 1 of the present invention.

FIG. 7 shows a current route in the inverter circuit in the case where a general positive dead time period is provided, at the time of shifting from FIG. 5A to FIG. 5B.

In this case, if resonant current Ir is smaller than load current, regenerative current flows into the power storage device 120 during the positive dead time. Therefore, the antiparallel diode 11b of the soft-switching circuit 10 is turned on, whereby the voltage Vbus of the main circuit positive potential portion 17 increases to the input voltage Vin or higher, and thus soft-switching operations of the switching elements of the inverter circuit 10 are not achieved.

Therefore, in the case where a general positive dead time period is provided, the resonant circuit needs to be configured to have a current capacity (for example, several hundred amperes) corresponding to load current, in order to achieve soft-switching operation. Thus, size increase in the capacitor 13, the reactor 14, and the switching element 15a is inevitable.

In contrast, in the case of applying the negative dead time which is a feature of the present embodiment 1, current flowing back through the lower arms can smoothly shift to the upper arms, and therefore it is possible to greatly reduce resonant current Ir.

Specifically, the resonant current Ir is merely current (for example, several amperes) for discharging/charging the parasitic capacitances of the inverter switching units 21 to 26 of the inverter circuit 20 and the parasitic capacitance of the first switching unit 11 of the soft-switching circuit 10, and therefore significant size reduction of the soft-switching circuit 10 can be achieved by the present embodiment 1.

Further, operation of the soft-switching circuit 10 which is a feature of the present embodiment 1 will be described with reference to FIG. 8, and also to FIG. 1.

Figure 8:
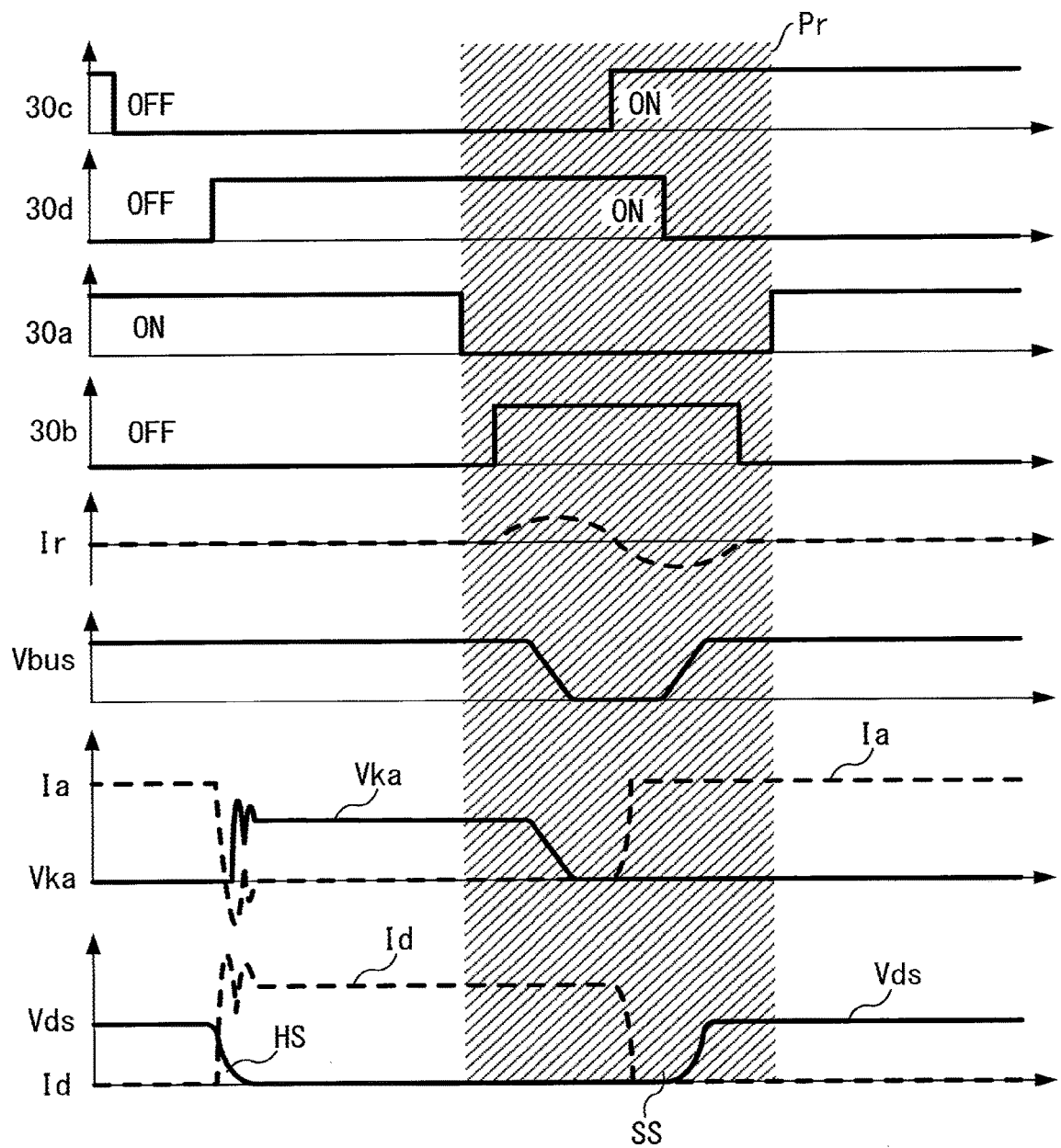
FIG. 8 is a time chart for illustrating soft-switching operation of the power conversion device according to embodiment 1 of the present invention.

FIG. 8 schematically shows a soft-switching waveform during the resonant circuit operation period Pr shown in FIG. 4, using U phase as an example.

In FIGS. 8, 30c and 30d indicate gate control signals for the switching elements 21a, 22a of the upper and lower arms for U phase. 30a and 30b indicate gate control signals for the switching elements 11a and 15a. Ir indicates current flowing through the reactor 14, and Vbus indicates voltage of the main circuit positive potential portion 17.

Ia (broken line) indicates current flowing through the antiparallel diode 21b of the U-phase upper arm, and Vka (solid line) indicates voltage across the terminals of the antiparallel diode 21b of the U-phase upper arm. Id (broken line) indicates current flowing through the switching element 22a of the U-phase lower arm, and Vds (solid line) indicates voltage between the source and the drain of the switching element 22a of the U-phase lower arm.

"HS" indicates hard switching, and "SS" indicates soft switching.

During the resonant circuit operation period Pr, the switching element 22a of the U-phase lower arm shifts from ON to OFF. Along with this, the antiparallel diode 21b of the U-phase upper arm shifts from OFF to ON, so that the current Ia entirely flows through the antiparallel diode 21b.

In FIG. 8, shifting of the switching element 22a of the U-phase lower arm from ON to OFF corresponds to change in 30d (gate control signal for U-phase lower arm switching element 22a) from ON to OFF.

The soft switching is switching in a state in which the voltage Vbus of the main circuit positive potential portion 17 is zero voltage, and therefore zero voltage switching in which switching loss does not occur can be achieved.

It is noted that the hard switching (HS) is switching in the case where a general positive dead time period is provided, and specifically, is switching of the switching element 22a of the U-phase lower arm from OFF to ON. Here, changes in current (Ia) flowing through the antiparallel diode 21b of the U-phase upper arm and voltage (Vka) across the terminals of the antiparallel diode 21b of the U-phase upper arm indicate that the antiparallel diode 21b of the U-phase upper arm shifts from ON to OFF as the switching element 22a of the U-phase lower arm shifts from OFF to ON.

Further, by providing the negative dead time, it is possible to smoothly shift from lower arm flow-back to upper arm flow-back, and therefore the peak value of current flowing through the resonant circuit 12 is smaller than the current value in the flow-back mode in which current flows back through the upper arm or the lower arm of the inverter circuit 20. Further, because the switching element 11a of the soft-switching circuit 10 performs zero current switching, switching loss does not occur.

In addition, current flowing through the switching element 15a of the soft-switching circuit 10 is small, and the switching loss thereof is negligible as compared to loss in the inverter circuit 20.

As described above, in the present embodiment 1, inverter operation at the time of reset of the saw-tooth-wave carrier signal is performed by soft switching, whereby switching loss occurring in the soft-switching circuit 10 can be suppressed. The number of times of switching in the inverter that occurs when the saw-tooth-wave carrier signal is reset is half the total number of times of switching. Thus, in the present embodiment 1, switching loss in the inverter circuit 20 can be reduced to ½.

In addition, loss occurring in the soft-switching circuit 10 is mainly conduction loss in the switching element 11a, and this conduction loss can be further reduced by connecting switching elements 11a in parallel.

As described above, in the present embodiment 1, by adopting a carrier signal having a reset shape, an operation mode in which the inverter is shifted from the upper arm flow-back mode to the lower arm flow-back mode is provided, and at this timing, the switching element 11a of the soft-switching circuit is turned off and the switching element 15a is turned on. Further, by providing the negative dead time period in the control of the upper and lower arms of the inverter, regenerative operation to the power storage device 120 is prevented, and soft switching is achieved with small resonant current.

Therefore, the carrier signal applied in the present embodiment 1 is not limited to a saw-tooth waveform, but overall carrier signals that provide such an operation mode of shifting from upper arm flow-back to lower arm flow-back are applicable.

In the present embodiment 1, a configuration example using the fixed delay circuits 63a to 63c has been shown as means for providing the positive dead time for switching during the rising period of the saw-tooth-wave carrier signal, and providing the negative dead time for switching at the time of reset of the saw-tooth-wave carrier signal. However, the means is not limited to the configuration example. Further, in the present embodiment 1, the case of shifting from upper arm flow-back to lower arm flow-back has been shown as an example. However, plus inputs and minus inputs of the comparators 61a to 61c may be switched with each other, whereby shifting from lower arm flow-back to upper arm flow-back may be performed.

In the present embodiment 1, the description has been given, assuming a power storage device as the DC power supply. However, the DC power supply may be obtained by converting AC power to DC power by an inverter. Alternatively, the DC power supply may be a photovoltaic generation device, a fuel battery, or an electric generator capable of DC output.

In the present embodiment 1, application of soft switching (negative dead time) in the power conversion device 100 has been described using an example in which current flows in a direction from the power storage device 120 to the electric motor 130. However, soft switching (negative dead time) in the power conversion device 100 can be applied in the same manner also in the case where current flows in a direction from the electric motor 130 as an electric generator to the power storage device 120.

That is, regardless of the direction of current flowing through the power conversion device 100, by applying soft switching (negative dead time), it is possible to configure a power conversion device that achieves size reduction and loss reduction in the added LC resonant circuit, and an electric motor drive device using the power conversion device.

In embodiment 1, the resonant circuit 12 is formed by connecting the capacitor 13, the reactor 14, and the second switching unit in series, but is not limited to this configuration.

As described above, the power conversion device according to embodiment 1 includes the first switching unit connected between the DC power supply and the inverter circuit; the resonant circuit connected between the input terminals of the inverter circuit and formed by connecting the capacitor, the reactor, and the second switching unit in series; and the control unit which controls the inverter circuit, the first switching unit, and the second switching unit, wherein, during the resonant operation period in which the first switching unit is controlled to be off and the second switching unit is controlled to be on, the control unit controls the inverter circuit so as to shift from the mode in which current flows back through one of the upper arm and the lower arm of the inverter circuit to the mode in which current flows back through the other arm, and provides a period in which the upper arm and the lower arm for every phase of the inverter circuit are turned on at the same time. In addition, the electric motor drive device is configured using the above power conversion device. Therefore, size reduction and loss reduction of the added LC resonant circuit can be achieved.

Embodiment 2

A power conversion device according to embodiment 2 is configured such that, in the power conversion device according to embodiment 1, the delay times of the gate control signals for the switching elements of the upper arms and the lower arms in the inverter circuit are changed in accordance with the operation condition for each phase.

Figure 9:
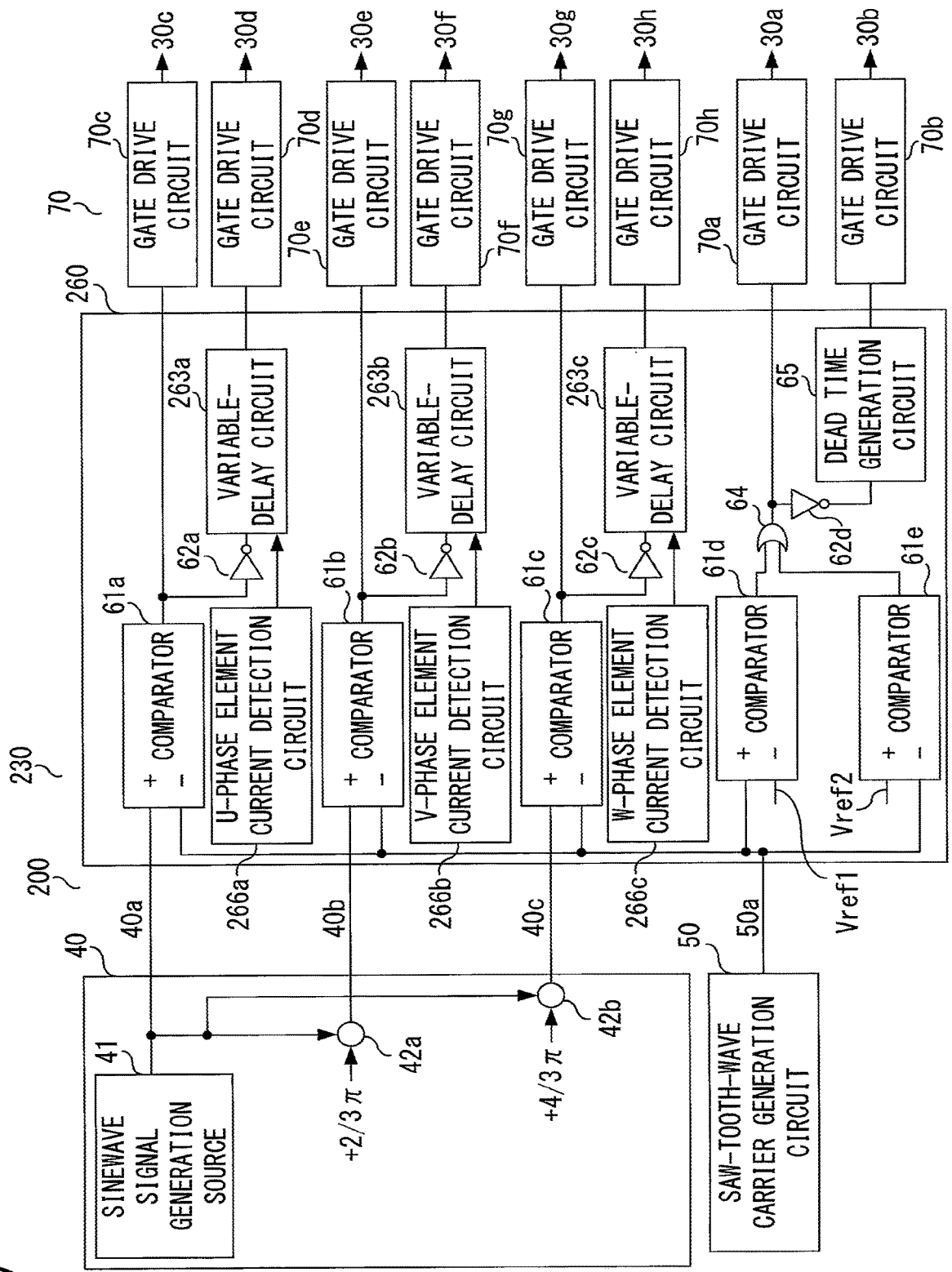
FIG. 9 is an internal block diagram of a control unit in a power conversion device according to embodiment 2 of the present invention.

Hereinafter, the power conversion device according to embodiment 2 will be described, focusing on difference from embodiment 1, with reference to FIG. 9 which is an internal block diagram of a control unit. In FIG. 9, parts that are the same as or correspond to those in FIG. 2 in embodiment 1 are denoted by the same reference characters.

For discrimination between embodiments, reference characters are given as a power conversion device 200, a control unit 230, and a control signal generation circuit 260.

First, the configuration of the control unit 230 of the power conversion device 100 will be described with reference to FIG. 9.

Difference in configuration between the control unit 230 according to embodiment 2 and the control unit 30 according to embodiment 1 is the control signal generation circuit 260. In the control signal generation circuit 260, the fixed delay circuits 63a to 63c of the control signal generation circuit 260 in embodiment 1 are replaced with variable-delay circuits 263a to 263c, and a U-phase element current detection circuit 266a, a V-phase element current detection circuit 266b, and a W-phase element current detection circuit 266c are added.

Figure 2:
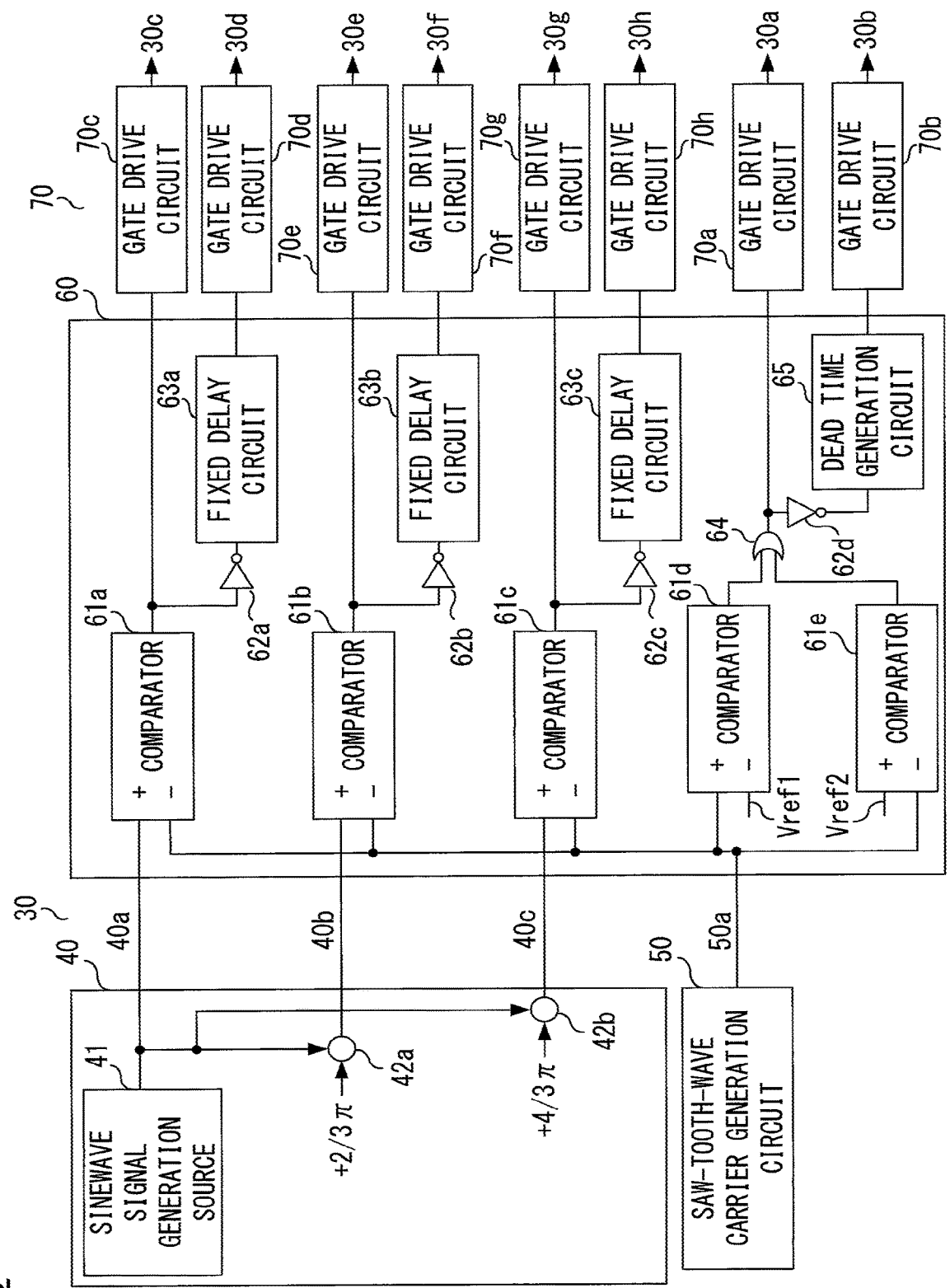
FIG. 2 is an internal block diagram of a control unit in the power conversion device according to embodiment 1 of the present invention.

As compared to the generation method for the control signals in embodiment 1 shown in FIG. 2, in FIG. 9, the variable-delay circuits 263a to 263c vary the delay times in accordance with outputs of the element current detection circuits 266a to 266c for the respective phases. Thus, as compared to the case of providing a predetermined delay time in embodiment 1, in the present embodiment 2, it is possible to optimize the delay time in accordance with the operation state for each phase.

As a result, the dead time can be minimized, and therefore an effect of suppressing reduction in power conversion efficiency due to addition of the dead time is obtained.

It is noted that, as the input signals to the element current detection circuits 266a to 266c for the respective phases, the measured value of current flowing through the switching element in the upper arm or the lower arm for each phase, or current for each phase for driving the electric motor 130, may be used.

In the present embodiment 2, the configuration of using the element current detection circuits 266a to 266c for the respective phases as a method for detecting the operation states for the respective phases has been shown as an example. However, a method of detecting element voltages for the respective phases may be used. In this case, as input signals to the element voltage detection circuits for the respective phases, the measured value of voltage between the drain and the source of the switching element in the upper arm or the lower arm for each phase can be used.

In the present embodiment 2, the configurations and operations other than the control signal generation circuit 260 are the same as in embodiment 1, and therefore the description thereof is omitted.

As described above, the power conversion device according to embodiment 2 is configured such that the delay times of the gate control signals for the switching elements of the upper arms and the lower arms in the power conversion device of embodiment 1 are changed in accordance with the operation condition for each phase. Therefore, as in embodiment 1, the power conversion device and the electric motor drive device using the same according to embodiment 2 can achieve size reduction and loss reduction of the added LC resonant circuit. Further, an effect of suppressing reduction in power conversion efficiency due to addition of the dead time is obtained.

Embodiment 3

A power conversion device according to embodiment 3 is configured such that the first switching unit of the soft-switching circuit in the power conversion device according to embodiment 1 is connected to the reference potential side of the power storage device, i.e., the ground side thereof.

Figure 10:
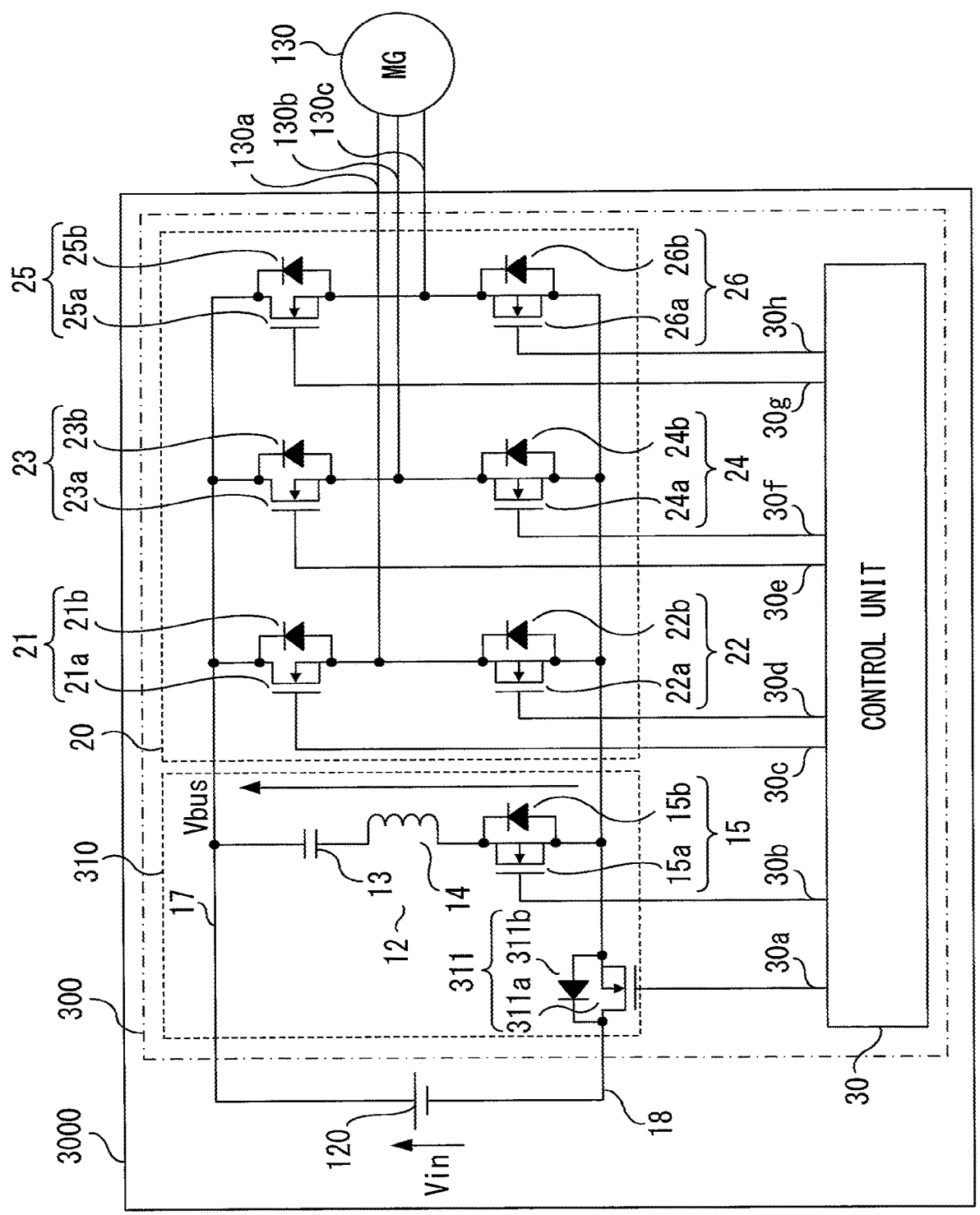
FIG. 10 is a configuration diagram of a power conversion device and an electric motor drive device according to embodiment 3 of the present invention.

Hereinafter, the power conversion device and the electric motor drive device according to embodiment 3 will be described, focusing on difference from embodiment 1, with reference to FIG. 10 which is a configuration diagram of the power conversion device and the electric motor drive device. In FIG. 10, parts that are the same as or correspond to those in FIG. 2 in embodiment 1 are denoted by the same reference characters.

For the purpose of discrimination between embodiments, reference characters are given as an electric motor drive device 3000, a power conversion device 300, a soft-switching circuit 310, and a first switching unit 311.

First, the configuration of the soft-switching circuit 310 in the power conversion device 300 will be described with reference to FIG. 10.

In the power conversion device 300 according to embodiment 3, the soft-switching circuit 310 is different in the position of the first switching unit from the soft-switching circuit 10 in embodiment 1.

In the soft-switching circuit 310 of embodiment 3, the first switching unit 311 is connected to the reference potential side of the power storage device 120, i.e., the ground side thereof, and the source terminal of a switching element 311a of the first switching unit 11 is connected to the main circuit reference potential portion 18.

Because the first switching unit 311 is connected to the reference potential side of the power storage device 120, the source terminal of the switching element 11a of the first switching unit has the same potential as the main circuit reference potential portion 18. Therefore, the insulation interface and the insulation power supply for the gate drive circuit for the switching element 11a of the first switching unit can be omitted, and thus size reduction of the entire device can be achieved.

In the present embodiment 3, the configurations and operations other than the position of the first switching unit 311 of the soft-switching circuit 310 are the same as in embodiment 1, and therefore the description thereof is omitted.

As described above, the power conversion device according to embodiment 3 is configured such that the first switching unit of the soft-switching circuit in the power conversion device according to embodiment 1 is connected to the reference potential side of the power storage device, i.e., the ground side thereof. Therefore, as in embodiment 1, the power conversion device and the electric motor drive device using the same according to embodiment 3 can achieve size reduction and loss reduction of the added LC resonant circuit. Further, the insulation interface and the insulation power supply for the gate drive circuit for the switching element of the first switching unit can be omitted, and an effect of reducing the size of the entire device is obtained.

Embodiment 4

A power conversion device and an electric motor drive device according to embodiment 4 are configured such that the inverter circuit and the electric motor in the power conversion device and the electric motor drive device according to embodiment 1 are modified to have a two-group configuration of group X and group Y.

Figure 11:
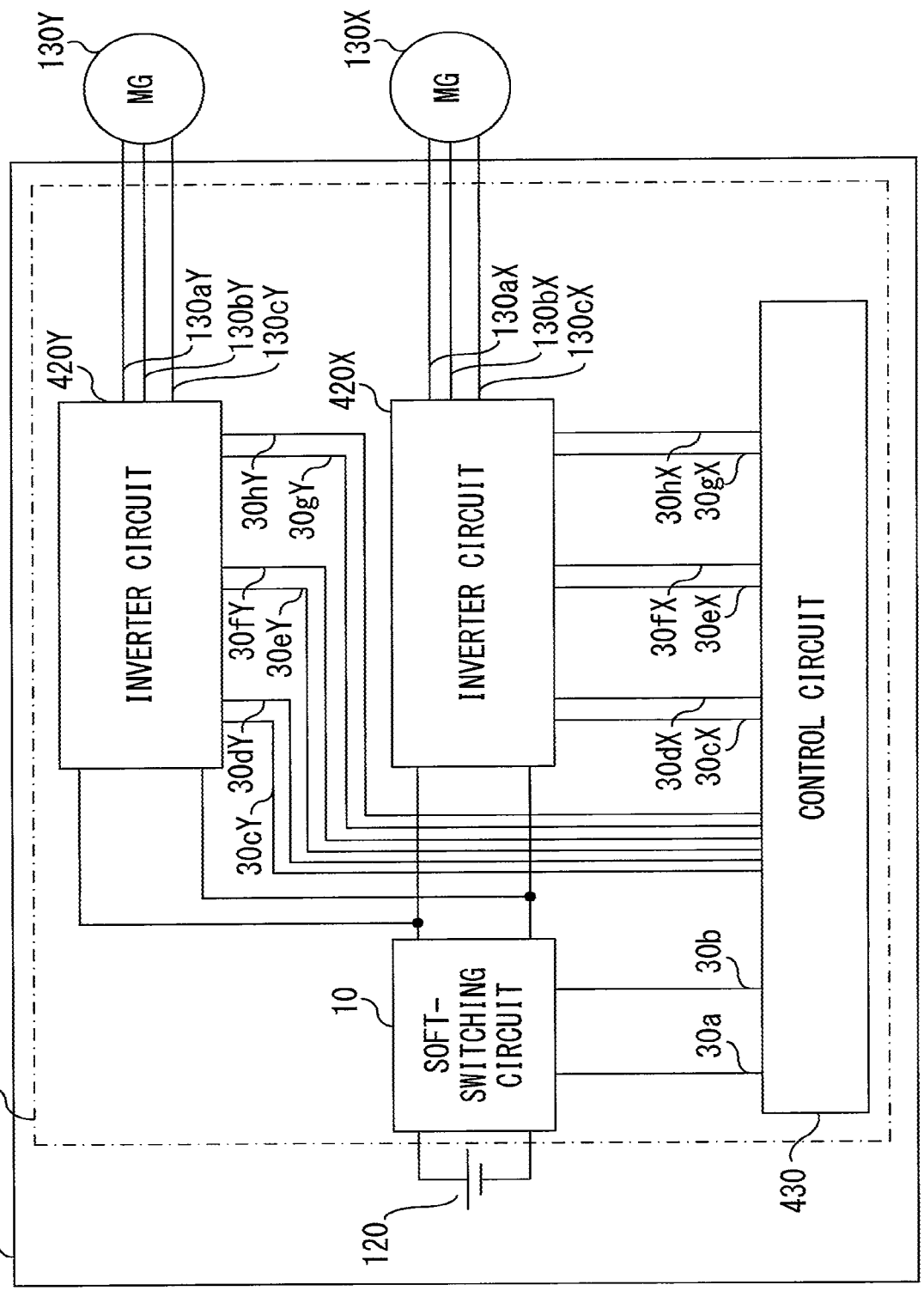
FIG. 11 is a block diagram showing the configurations of a power conversion device and an electric motor drive device according to embodiment 4 of the present invention.
Figure 12:
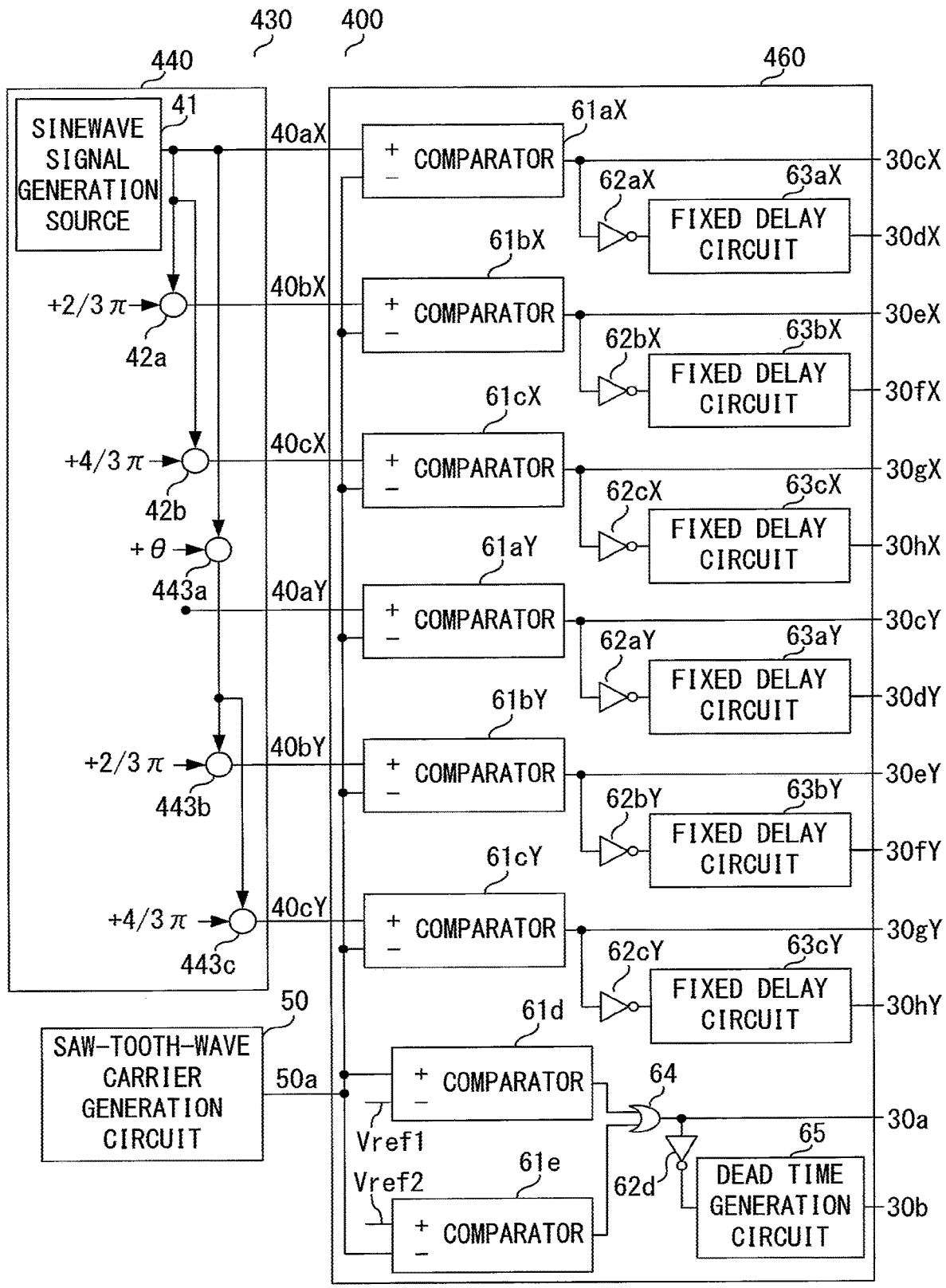
FIG. 12 is an internal block diagram of a control unit in the power conversion device according to embodiment 4 of the present invention.

Hereinafter, the power conversion device and the electric motor drive device according to embodiment 4 will be described, focusing on difference from embodiment 1, with reference to FIG. 11 which is a block diagram showing the configurations of the power conversion device and the electric motor drive device and FIG. 12 which is an internal block diagram of a control unit of the power conversion device. In FIG. 11 and FIG. 12, parts that are the same as or correspond to those in FIG. 1 and FIG. 2 in embodiment 1 are denoted by the same reference characters.

For the purpose of discrimination from embodiment 1, reference characters are given as an electric motor drive device 4000, a power conversion device 400, inverter circuits 420X, 420Y, a control unit 430, a reference signal generation circuit 440, and a control signal generation circuit 460.

In FIG. 12, for simplifying the drawing, the gate drive circuit units are not shown.

First, the entire configuration of the electric motor drive device 4000 and the power conversion device 400 according to embodiment 4 will be described with reference to FIG. 11.

The electric motor drive device 4000 converts power supplied from the power storage device 120 to AC power by the power conversion device 400, and drives two electric motors 130X, 130Y which are motors, by the converted power.

The power conversion device 400 includes the inverter circuits 420X, 420Y which respectively supply powers to two electric motors 130X, 130Y which are loads; the soft-switching circuit 10 connected between the power storage device 120 and the inverter circuits 420X, 420Y; and the control unit 430 which controls the soft-switching circuit 10 and the inverter circuits 420X, 420Y. Hereinafter, the two electric motors 130X, 130Y and the two inverter circuits 420X, 420Y are respectively referred to as group X and group Y, as appropriate.

The configurations and operations of the soft-switching circuit 10 and the inverter circuits 420X, 420Y are the same as in embodiment 1, and therefore the description thereof is omitted.

Next, the control unit 430 will be described.

The control unit 430 includes the reference signal generation circuit 440, the saw-tooth-wave carrier generation circuit 50, the control signal generation circuit 460, and the gate drive circuit units (not shown).

In the reference signal generation circuit 440, phase shifters 443a to 443c are added for the inverter circuit 420Y, as compared to the reference signal generation circuit 40 in embodiment 1.

Sinewave reference signals 40aY, 40bY, 40cY for the inverter circuit 420Y respectively correspond to U phase, V phase, W phase of the inverter circuit 420Y (i.e., electric motor 130Y). The phase of the reference signal generated by the sinewave signal generation source 41 is shifted by θ by the phase shifter 443a. Therefore, the phases of the sinewave reference signals 40aY, 40bY, 40cY are shifted by θ relative to the phases of the sinewave reference signals 40aX, 40bX, 40cX for the inverter circuit 420X (i.e., electric motor 130X).

The control signal generation circuit 460 is configured to correspond to the two inverter circuits 420X, 420Y, as compared to the control signal generation circuit 60 in embodiment 1. The configurations and operations of the respective components are the same as in embodiment 1.

That is, the control signal generation circuit 460 includes comparators 61aX to 61cX, inversion circuits 62aX to 62cX, and fixed delay circuits 63aX to 63cX, which correspond to the inverter circuit 420X.

In addition, the control signal generation circuit 460 includes comparators 61aY to 61cY, inversion circuits 62aY to 62cY, and fixed delay circuits 63aY to 63cY, which correspond to the inverter circuit 420Y.

In the case of driving the two-group electric motors (130X, 130Y) by the two-group inverter circuits (420X, 420Y), it is general that the sinewave reference signals for the respective phases of the inverter circuits in two groups are provided at different phases between the two groups, whereby ripple current occurring in the power storage device 120 is dispersed. In the present embodiment 4, the phase difference is set to θ.

Meanwhile, as for the saw-tooth-wave carrier signal 50a, the same signal is used between the group X and the group Y. By using the same carrier signal, switching in the group X and switching in the group Y are performed at the same time, when the saw-tooth-wave carrier signal is reset. Therefore, the gate control signals for the soft-switching circuit can be generated in the same manner as in FIG. 2.

That is, increase in the operation frequency of the soft-switching circuit can be suppressed, and increase in control load can be suppressed.

In embodiment 4, because the inverter circuits 420X, 420Y and the electric motors 130X, 130Y are configured in two groups, the total output torque of the electric motors can be increased. In addition, if designing is made such that one of the electric motors mainly serves for driving and the other electric motor mainly serves for electric generation, it is possible to optimally achieve both functions of driving and electric generation.

In the present embodiment 4, an example in which the inverter circuits and the electric motors are configured in two groups has been shown. However, a three-group configuration or a multi-group configuration having more groups may be applied in the same manner.

As described above, the power conversion device and the electric motor drive device according to embodiment 4 are configured such that the inverter circuit and the electric motor in the power conversion device and the electric motor drive device according to embodiment 1 are modified to have a two-group configuration of group X and group Y. Therefore, as in embodiment 1, the power conversion device and the electric motor drive device using the same according to embodiment 4 can achieve size reduction and loss reduction of the added LC resonant circuit. Further, increase in the total output torque of the electric motors, and optimization of both functions of driving and electric generation, can be achieved.

Embodiment 5

A power conversion device and an electric motor drive device according to embodiment 5 are configured such that, in the power conversion device and the electric motor drive device according to embodiment 4, a phase difference 0 is provided between the saw-tooth-wave carrier signals for the inverter circuits in two groups.

Figure 13:
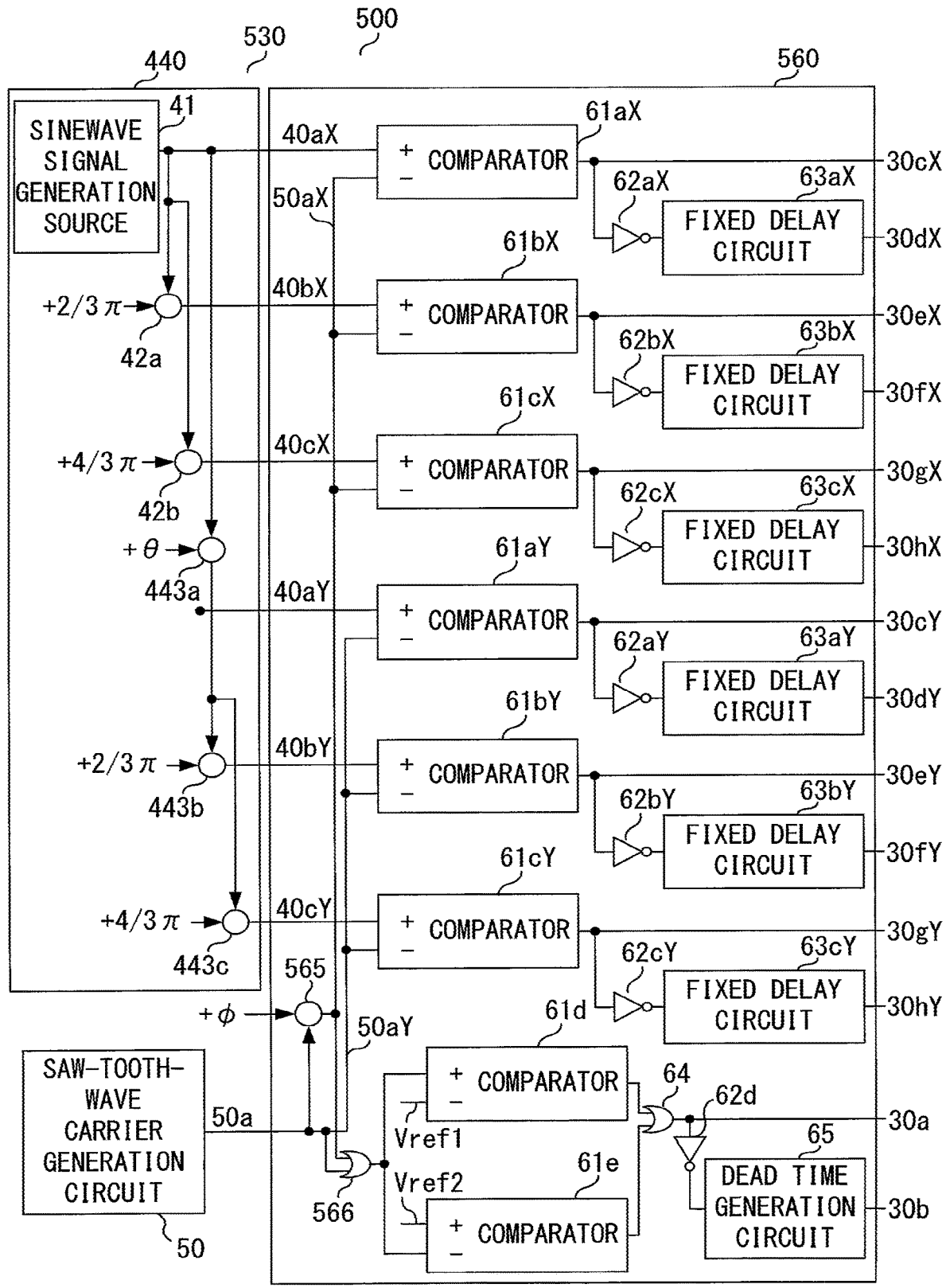
FIG. 13 is an internal block diagram of a control unit in a power conversion device according to embodiment 5 of the present invention.

Hereinafter, the power conversion device and the electric motor drive device according to embodiment 5 will be described, focusing on difference from embodiment 4, with reference to FIG. 13 which is an internal block diagram of the power conversion device. In FIG. 13, parts that are the same as or correspond to those in FIG. 12 in embodiment 4 are denoted by the same reference characters.

For the purpose of discrimination from embodiment 4, reference characters are given as a power conversion device 500, a control unit 530, and a control signal generation circuit 560.

In FIG. 13, for simplifying the drawing, the gate drive circuit units are not shown.

First, the entire configuration of the electric motor drive device and the power conversion device 500 according to embodiment 5 are the same as that of the electric motor drive device 4000 and the power conversion device 400 according to embodiment 4.

That is, the electric motor drive device converts power supplied from the power storage device to AC power by the power conversion device 500, and drives two electric motors which are motors, by the converted power.

Next, the control unit 530 will be described.

Difference from the control unit 430 of embodiment 4 is the control signal generation circuit 560. First, difference in configuration will be described.

In the control signal generation circuit 560, a phase shifter 565 and an addition circuit 566 are added as compared to the control signal generation circuit 460 of embodiment 4.

By the phase shifter 565, the phase of the saw-tooth-wave carrier signal 50a generated by the saw-tooth-wave carrier generation circuit 50 is shifted by φ, and the resultant signal is used as a carrier signal (50aX) for group X.

By the addition circuit 566, the saw-tooth-wave carrier signal 50a (50aY) and the carrier signal (50aX) for group X the phase of which has been shifted by φ are added, and the resultant output is inputted to the comparators 61d, 61e.

It is noted that, in FIG. 13, although being the same signal as the saw-tooth-wave carrier signal 50*a*, the saw-tooth-wave carrier signal is referred to as 50*a*Y, for clarifying discrimination from 50*a*X.

Next, operation of the power conversion device 500 will be described, focusing on difference from the power conversion device 400 in embodiment 4.

The phase difference φ is provided for the purpose of dispersing noise and ripple current occurring in the power storage device 120. In this case, reset timings of the carrier signals 50*a*X and 50*a*Y for the inverter circuits in group X and group Y differ from each other, and therefore, it is necessary to operate the soft-switching circuit at both reset timings.

Accordingly, in the present embodiment 5, the carrier signals 50*a*X and 50*a*Y are added by the addition circuit 566 and then inputted to the comparators 61*d* and 61*e*. Therefore, the operation frequency of the soft-switching circuit is doubled as compared to embodiment 4, and loss in the soft-switching circuit is also doubled.

In a conventional method, loss in the soft-switching circuit is a problem and it is considered that it is necessary to take measures such as providing soft-switching circuits for the inverter circuits in group X and group Y individually.

In contrast, in the electric motor drive device according to the present embodiment 5, resonant current in the soft-switching circuit is reduced, whereby one identical soft-switching circuit can be applied to the inverter circuits in group X and group Y which respectively perform switching at different timings.

The configurations and operations other than the control signal generation circuit 560 of the control unit 530 in the present embodiment 5 are the same as in embodiment 4, and therefore the description thereof is omitted.

In the present embodiment 5, an example in which the inverter circuits and the electric motors are configured in two groups has been shown. However, a three-group configuration or a multi-group configuration having more groups is also applicable easily, by providing a phase difference for the sinewave reference signals and the saw-tooth-wave carrier signals in the respective groups.

As described above, the power conversion device and the electric motor drive device according to embodiment 5 are configured such that, in the power conversion device and the electric motor drive device according to embodiment 4, the phase difference φ is provided between the saw-tooth-wave carrier signals for the inverter circuits in two groups. Therefore, as in embodiment 1, the power conversion device and the electric motor drive device using the same according to embodiment 5 can achieve size reduction and loss reduction of the added LC resonant circuit. Further, increase in the total output torque of the electric motors, and optimization of both functions of driving and electric generation, can be achieved, and in addition, noise and ripple current occurring in the power storage device can be dispersed.

It is noted that, within the scope of the present invention, the above embodiments may be freely combined with each other, or each of the above embodiments may be modified or simplified as appropriate.

INDUSTRIAL APPLICABILITY

Because the present invention can achieve size reduction and loss reduction of an LC resonant circuit needed for soft-switching operation, the present invention is widely applicable to a power conversion device which converts power from a DC power supply, to AC power and supplies power to an electric motor, and an electric motor drive device using the same.

The invention claimed is:

1. A power conversion device comprising:
   an inverter circuit which converts power from a DC power supply to single-phase or multi-phase AC power;
   a first switching unit connected between the DC power supply and the inverter circuit;
   a resonant circuit connected between input terminals of the inverter circuit and formed by connecting a capacitor, a reactor, and a second switching unit; and
   a control unit which controls the inverter circuit, the first switching unit, and the second switching unit, wherein
   during a resonant operation period in which the first switching unit is controlled to be off and the second switching unit is controlled to be on, the control unit controls the inverter circuit so as to shift from a mode in which current flows back through one of an upper arm and a lower arm of the inverter circuit, to a mode in which current flows back through the other arm, and provides a period in which the upper arm and the lower arm for every phase of the inverter circuit are turned on at the same time.

2. The power conversion device according to claim 1, wherein
   a peak value of current flowing through the resonant circuit is smaller than a current value in a flow-back mode in which current flows back through the upper arm or the lower arm in the inverter circuit.

3. The power conversion device according to claim 2, wherein
   the control unit controls the inverter circuit through PWM control using a saw-tooth-wave carrier signal.

4. The power conversion device according to claim 2, wherein
   the control unit performs control so that the period in which the upper arm and the lower arm are turned on at the same time is a predetermined time period.

5. The power conversion device according to claim 2, wherein
   the control unit controls the period in which the upper arm and the lower arm are turned on at the same time, on the basis of a current value or a voltage value of a switching element composing the inverter circuit.

6. The power conversion device according to claim 1, wherein
   the control unit controls the inverter circuit through PWM control using a saw-tooth-wave carrier signal.

7. The power conversion device according to claim 1, wherein
   the control unit performs control so that the period in which the upper arm and the lower arm are turned on at the same time is a predetermined time period.

8. The power conversion device according to claim 1, wherein
   the control unit controls the period in which the upper arm and the lower arm are turned on at the same time, on the basis of a current value or a voltage value of a switching element composing the inverter circuit.

9. The power conversion device according to claim 1, wherein
   the first switching unit is connected to a reference potential side of the DC power supply.

10. An electric motor drive device comprising:
a DC power supply; and
a power conversion device including
an inverter circuit which converts power from the DC power supply to single-phase or multi-phase AC power,
a first switching unit connected between the DC power supply and the inverter circuit,
a resonant circuit connected between input terminals of the inverter circuit and formed by connecting a capacitor, a reactor, and a second switching unit, and
a control unit which controls the inverter circuit, the first switching unit, and the second switching unit, wherein
the inverter circuit is connected to an electric motor, and
during a resonant operation period in which the first switching unit is controlled to be off and the second switching unit is controlled to be on, the control unit of the power conversion device controls the inverter circuit so as to shift from a mode in which current flows back through one of an upper arm and a lower arm of the inverter circuit, to a mode in which current flows back through the other arm, and provides a period in which the upper arm and the lower arm for every phase of the inverter circuit are turned on at the same time.

11. The electric motor drive device according to claim 10, wherein a peak value of current flowing through the resonant circuit is smaller than a current value in a flow-back mode in which current flows back through the upper arm or the lower arm in the inverter circuit.

12. The electric motor drive device according to claim 11, wherein
the control unit controls the inverter circuit through PWM control using a saw-tooth-wave carrier signal.

13. The electric motor drive device according to claim 11, wherein
the control unit performs control so that the period in which the upper arm and the lower arm are turned on at the same time is a predetermined time period.

14. The electric motor drive device according to claim 10, wherein
the control unit controls the inverter circuit through PWM control using a saw-tooth-wave carrier signal.

15. The electric motor drive device according to claim 10, wherein
the control unit performs control so that the period in which the upper arm and the lower arm are turned on at the same time is a predetermined time period.

16. The electric motor drive device according to claim 10, wherein
the control unit controls the period in which the upper arm and the lower arm are turned on at the same time, on the basis of a current value or a voltage value of a switching element composing the inverter circuit.

17. The electric motor drive device according to claim 10, wherein
the first switching unit is connected to a reference potential side of the DC power supply.

18. The electric motor drive device according to claim 10, wherein
the electric motor generates power, and the power conversion device regenerates the generated power to the DC power supply.

19. The electric motor drive device according to claim 10, wherein
the electric motor and the inverter circuit are configured with plural pairs of electric motors and inverter circuits, and
the control unit controls the plurality of inverter circuits, using carrier signals having the same phase.

20. The electric motor drive device according to claim 10, wherein
the electric motor and the inverter circuit are configured with plural pairs of electric motors and inverter circuits, and
the control unit controls the plurality of inverter circuits, using carrier signals having different phases.

* * * * *